(12) United States Patent
Hattori

(10) Patent No.: US 6,773,801 B2
(45) Date of Patent: Aug. 10, 2004

(54) FINE PARTICLE LAYER LAMINATED FILM AND OPTICAL FUNCTIONAL MATERIAL

(75) Inventor: Hideshi Hattori, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 62 days.

(21) Appl. No.: 10/115,790

(22) Filed: Apr. 3, 2002

(65) Prior Publication Data

US 2002/0146555 A1 Oct. 10, 2002

(30) Foreign Application Priority Data

Apr. 6, 2001 (JP) .................................... 2001-109115

(51) Int. Cl.$^7$ ................................................. B32B 5/16
(52) U.S. Cl. .................... 428/323; 428/328; 428/329; 428/330; 428/331; 428/324; 428/407; 427/389; 427/402; 427/419; 427/419.1; 427/419.2; 427/419.3; 427/419.5; 427/458; 427/470
(58) Field of Search ............................... 428/323, 328, 428/329, 330, 331, 324, 407; 427/389, 402, 419, 419.2, 419.3, 419.5, 458, 470, 419.1

(56) References Cited

U.S. PATENT DOCUMENTS

| | | | |
|---|---|---|---|
| 5,701,298 A | | 12/1997 | Diachina et al. |
| 6,357,910 B1 | * | 3/2002 | Chen et al. .................. 374/131 |
| 6,447,887 B1 | * | 9/2002 | Claus et al. ................. 428/209 |
| 6,582,658 B1 | * | 6/2003 | Hood et al. ................... 422/58 |

FOREIGN PATENT DOCUMENTS

| | | |
|---|---|---|
| JP | 3204966 | 6/2001 |
| JP | 2001-350015 | 12/2001 |

OTHER PUBLICATIONS

Kristie M. Kenahan, Yanjing Liu and Richard O. Claus: "Electrostatic Self–Assembly Processes for Multilayer Optical Filters" Journal, *Part of the SPIE Conference on Smart Materials Technologies,* SPIE vol. 3675, Mar. 1999, pp. 74–83.

* cited by examiner

*Primary Examiner*—Leszek B Kiliman
(74) *Attorney, Agent, or Firm*—Timothy J. Keefer; Seyfarth Shaw LLP

(57) ABSTRACT

The present invention discloses a fine particle layer laminated film configured in such a manner that a plurality of fine particle layers containing the fine particles, of which average particle diameters are in the range of 1 nm and 95 nm, are laminated; wherein the fine particles in the fine particle layer laminated film are accreted by polymer molecules; there are air spaces within a film of the fine particle layer laminated film; and a density of the fine particles in the fine particle layer laminated film is in the range of 40% and 80% in percentage by volume. According to the present invention, it is possible to obtain a laminated film sufficiently having a property of the fine particle, for example, a property such as a low index of refraction or the like. Therefore, the present invention has an effect such that the fine particle layer laminated film according to the present invention can be preferably used for an application such as an antirelection film or the like.

12 Claims, 3 Drawing Sheets

FINE PARTICLE LAYER LAMINATED FILM AND OPTICAL FUNCTIONAL MATERIAL

BACKGROUND OF THE INVENTION

The present invention relates to a fine particle layer laminated film which is configured in such a manner that the fine particle layers containing ultra fine particles are laminated and an optical functional material that uses this fine particle layer laminated film, which can be used in a filed of an optical apparatus and an optical communication apparatus or the like.

Conventionally, an optical functional material that is used for an optical apparatus and an optical communication apparatus or the like has been manufactured by the use of a vacuum film formation device and an exposure device. For example, various optical filters or the like are manufactured by a vapor deposition method by the use of not less than two kinds of materials having different indices of refraction. Alternatively, a holographic optical element or the like is manufactured by the use of an accurate interference exposure device. However, according to such a method, the vacuum device is needed, so that this involves a problem in cost. Additionally, to manufacture a large optical apparatus involves a problem such that a large vacuum device is inevitably required.

As a method for solving such a problem, recently, a manufacturing method of an optical functional material applying an alternate adsorption process using an organic polymer molecule and a surface sol-gel process using metal alkoxide has been suggested (Shiratori, Oyo Buturi (Japanese), Vol. 69, p. 553 to 557, 2000). This method is different from a conventional one in that it serves to manufacture an optical functional material in a wet processs. Further, since this method uses adsorption and a surface reaction in a liquid phase, this method comprises a process at a room temperature and a normal pressure. Therefore, this method does not require a vacuum device and it can easily manufacture a large optical functional material, so that this method contributes to solution of the conventional problems. Additionally, according to this method, there is an advantage such that a curved surface and a irregular surface car be evenly formed.

However, as a defect of such a method, it is considered that it takes very long time for forming a film since the layers are repeatedly laminated in a molecular order.

In recent years, an ultra fine particle less than a visible light wavelength attracts attention from the point of controlling an index of refraction of a transparent material. An average particle diameter of the ultra fine particle is sufficiently small, so that there is little scattering of light due to a particle. Therefore, the ultra fine particle has an advantage such that the index of refraction can be controlled without losing transparency. However, according to a conventional method, it is very difficult to fill such an ultra fine particle having a small particle diameter in a thin film in the high density. As a result, it is difficult to develop an optical functional material using such an ultra fine particle effectively.

SUMMARY OF THE INVENTION

The present invention has been made taking the foregoing problems into consideration, an object of the present invention is to provide a fine particle layer laminated film, which does not require a vacuum device that has been needed for a vapor deposition method or the like, and is capable of being manufactured at a relatively low cost by enhancing low throughput, namely, a problem in the case of a conventional alternate adsorption process is used, and an optical functional material that uses this fine particle layer laminated film.

In order to attain the above described purpose, the present invention provides a fine particle layer laminated film configured in such a manner that a plurality of fine particle layers containing the fine particles, of which average particle diameters are in the range of 1 nm and 95 nm, are laminated; wherein the fine particles in the fine particle layer laminated film are accreted by polymer molecules; there are air spaces within a film of the fine particle layer laminated film; and a density of the fine particles in the fine particle layer laminated film is in the range of 40% and 80% in percentage by volume.

In this way, the fine particle layer laminated film according to the present invention, the fine particles are filled in the fine particle layer laminated film in the high density. Therefore, it is possible to use a property of the fine particle, for example, an index of refraction or the like. Simultaneously, there is an air space within the film, so that it is possible to realize the film having a low index of refraction, which is cannot be realized by a conventional material in which the fine particles are dispersed in a dielectric material such as a plastic or the like. Further, according to the present invention, since the fine particles are glued by a polymer molecule to be layered, it is possible to laminate fine particle layers configured by the fine particles having different indices of refraction, As a result, it is possible to realize a fine particle layer laminated film having a modulated index of refraction, which can be applied for a reflection reducing film, an optical filter or the like.

According to the present invention, it is preferable that a difference in an index of refraction between a fine particle layer having the lowest index of refraction among the above described plural laminated fine particle layers and a fine a particle layer having the highest index of refraction among them is not less than 0.2 in an arbitrary wavelength in the range of not less than 400 nm and not more than 700 nm. It is because that, for example, in the case that a fine particle layer laminated film comprises a fine particle layer laminated film having a modulated index of refraction as described above, it is preferable to have a difference in the index of refraction as described above for effecting its function.

According to the present invention, it is preferable that an index of refraction of at least one fine particle layer in the fine particle layer laminated film is not more than 1.32. By forming a layer having such an index of refraction, it is possible to make a fine particle layer laminated film into an optical function that has not been obtained conventionally, for example, an optical function having an ultra low reflection.

According to the present invention, the present invention provides an optical functional material having A fine particle layer laminated film according to any one of claims 1 to 4 and a supporting material for supporting this fine particle layer laminated film. There is a case such that above described fine particle layer laminated film has no self supporting property. In such a case, the fine particle layer laminated film is used together with a supporting material as an optical functional material.

As a supporting material in this case, as described in claim 6, the supporting material may comprise a transparent base material, which is arranged on one surface of the fine particle layer laminated film. It is because that, since the fine particle layer laminated film according to the present invention is normally formed on a base material, if this base material comprises a transparent base material, it is possible to use this fine particle layer laminated film as an optical functional material as it is without reference to whether there is a self supporting property in the fine particle layer laminated film.

Alternatively, according to the present invention, the supporting material maybe a transparent sealing material, which seals the fine particle layer laminated film with leaving aside one surface of the fine particle layer laminated film. This invention has an advantage such that, a strength of the fine particle layer laminated film is secured and modification of the fine particle layer laminated film is prevented by sealing the fine particle layer laminated film except for a surface at the base material side as well as the fine particle layer laminated film is transparent, for example, in the case that a strength of the fine particle layer laminated film is very weak and it is improper that the fine particle layer laminated film is modified by moisture or the like, so that this fine particle layer laminated film can be used as an optical functional material as it is.

Further, according to the present invention, it is preferable that the fine particle layer laminated film is formed on the supporting material or in the supporting material in a pattern form. It is because that it becomes possible to use the fine particle layer laminated film for various applications such as a color filter and a lens array or the like by forming the present fine particle layer laminated film in a pattern form.

According to the present invention, the present invention provides a manufacturing method of a fine particle layer laminated film for forming a fine particle layer laminated film on a base material by laminating the fine particle layers containing the fine particles, of which average particle diameters are in the range of 1 nm, and 95 nm, according to an alternate adsorption method. According to the present invention, a fine particle is adsorbed according to an alternate adsorption method, so that it is possible to make respective layers to be adsorbed into a rather thick film. Accordingly, differently from a film which is formed according to a conventional alternate adsorption method, it becomes possible to form a fine particle layer laminated film having a thickness, which is necessary in practice, for rather short time, so that it is possible to reduce a labor hour and manufacturing cost.

In this case, it is preferable that the alternate Adsorption method depends on the electrostatic interaction. If this method comprises a method by the use of electrostatic interaction, it is possible to make this fine particle layer laminated film into one having predetermined adsorption strength. Further, it is also possible to manufacture fine particle layer laminated film by using a commercially available material. Therefore, the present invention has an advantage such that to manufacture fine particle layer laminated film is advantageous in cost.

Furthermore, according to the present invention, the present invention provides a manufacturing method of a fine particle layer laminated film comprising a process of forming a layer containing polymer molecules having a polyelectrolyte on a base material;

preparing a fine particle dispersed liquid, in which the fine particles, of which average particle diameters are in the range of 1 nm and 95 nm, are dispersed in a solvent capable of swelling the layer containing polymer molecules;

forming a fine particle layer laminated film on a base material by means of repeating a fine particle layer forming process, which is a process to contact the layer containing polymer molecules with the fine particle dispersed liquid, for forming the fine particle layer plural times.

According to this method, it is possible to form a fine particle layer easily by bringing a fine particle dispersion liquid into contact with a layer containing the polymer molecules. Further, it is possible to make respective fine particle layers rather thick. Therefore, it becomes possible to form a fine particle layer laminated film having a thickness, which is necessary in practice, for rather short time.

In this case, it is preferable that the polyelectrolyte is a polyelectrolyte having an electric charge opposite to the electric charge of the fine particles and the polyelectrolyte is a water soluble polyelectrolyte.

It is because that, by making an electric charge of a polyelectrolyte and an electric charge of a fine particle opposite to each other, it becomes possible to strongly incorporate a fine particle in a polyelectrolyte by an electrostatic attraction force in addition to Van der Waals force to be fixed, so that it becomes possible to stably fill the fine particles within a polymer molecule substance in the high density. Alternatively, a water soluble polyelectrolyte is preferable. It is because that there are many cases that a fine particle dispersion liquid containing the useful fine particles comprises a water system colloidal solution and in the case of using such a fine particle dispersion liquid, a water soluble polyelectrolyte is preferable.

In a fine particle layer laminated film according to the present invention, the fine particles in the fine particle layer laminated film are filled in the high density, so that it is possible to obtain a laminated film sufficiently having a property of the fine particle, for example, a property such as a low index of refraction or the like. Therefore, the present invention has an effect such that the fine particle layer laminated film according to the present invention can be preferably used for an application such as an antirelection film or the like.

DETAILED DESCRIPTION OF THE INVENTION

Figure 1:
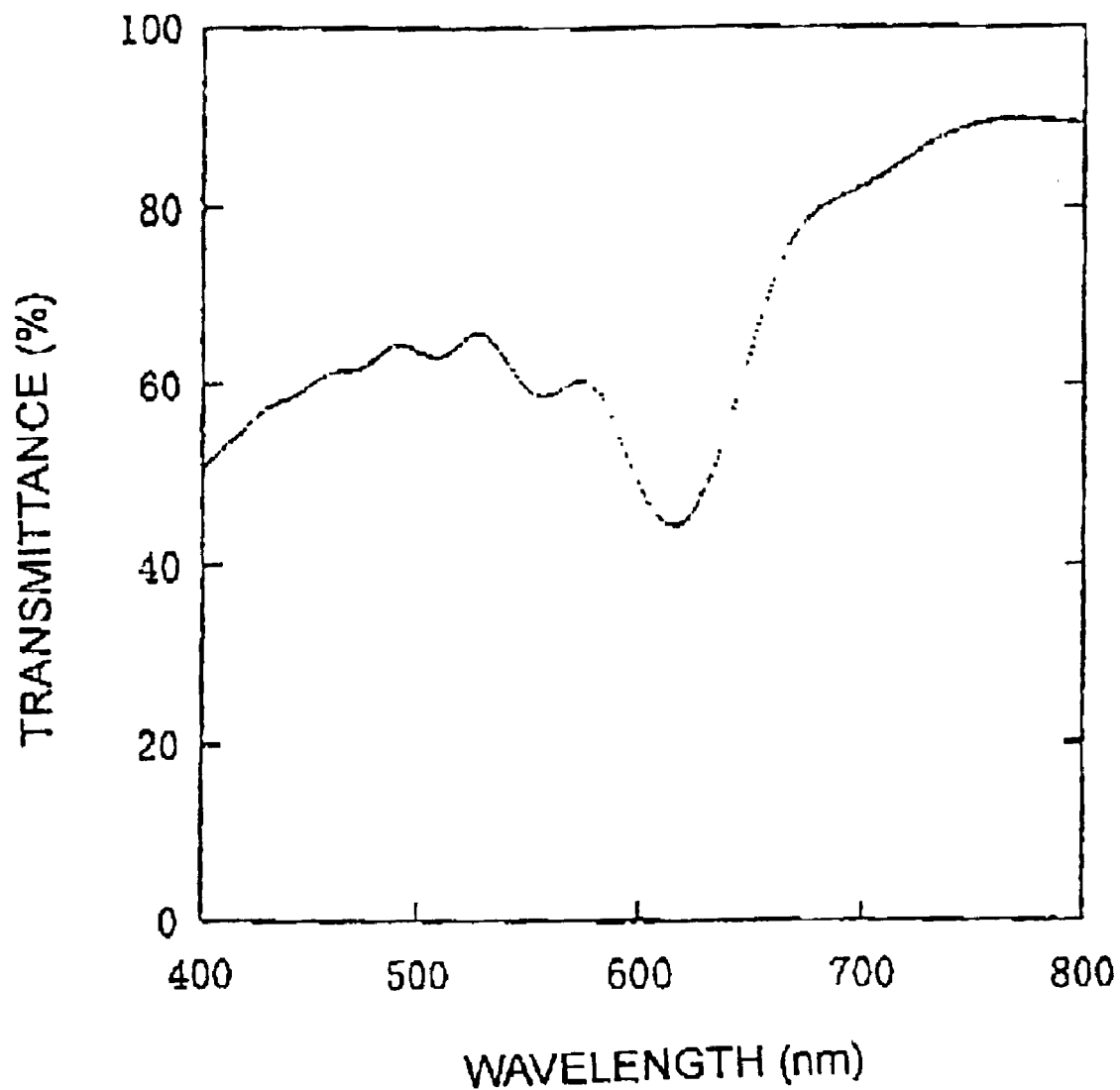
FIG. 1 is a graph for illustrating transmittance of an embodiment of a fine particle layer laminated film according to the present invention.
Figure 2:
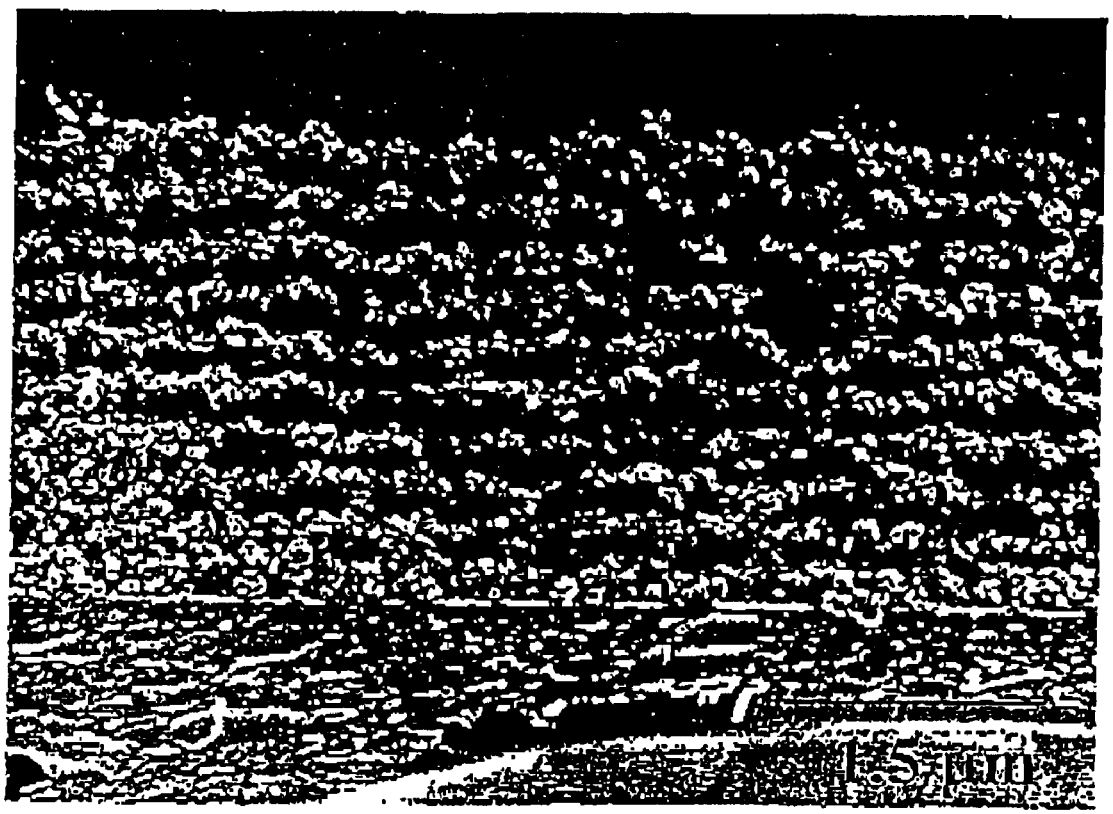
FIG. 2 is an electron micrograph for illustrating a section of an embodiment of a fine particle layer laminated film according to the present invention.

An inventor of the present invention pays attention to a point that an ultra fine particle less than a visible light wavelength from the point of controlling an index of refraction of a transparent material and then, the inventor has completed the present invention. In other words, since an average particle diameter of such an ultra fine particle is sufficiently small, so that there is little scattering of light due to a particle. Therefore, the index of refraction can be controlled without losing transparency by using such an ultra fine particle. Alternatively, the ultra fine particle is sufficiently large than a molecule, so that it is possible to extremely shorten time required for forming a film by laminating the layers containing such an ultrafine particle compared to a conventional alternate adsorption process for repeatedly laminating the layers in a molecular order. A fine particle layer laminated Film according to the present invention, an optical functional material which uses this fine particle layer laminated film according to the present invention and a manufacturing method of the fine particle layer laminated film according to the present invention will be sequentially described below.

1. A Fine Particle Layer Laminated Film

At first, a fine particle layer laminated film according to the present invention will be explained in detail. A fine particle layer laminated film according to the present invention is a plurality of fine particle layers containing the fine particles, of which average particle diameter is less than a visible light wavelength, are laminated in the fine particle layer laminated film and a plurality of fine particle layers, in which the fine particles are filled in the extremely higher density compared to the conventional case, are laminated in the fine particle layer laminated film.

According to the fine particle layer laminated film of the present invention, the fine particles, of which average particle diameter is less than a visible light wavelength, are used, so that there is little scattering of light due to a particle, Therefore, a property of a fine particle, for example the index of refraction, can be controlled without losing transparency. Alternatively, since a plurality of fine particle layers, in which such fine particles are tilled in the extremely higher density compared to the conventional case, are laminated in the fine particle layer laminated film, it is possible to sufficiently and effectively realize a property of a fine particle such as an index of retraction or the like as a property of a fine particle layer or a property of a fine particle layer laminated film. Then, since such fine particle layers are laminated, for example, it becomes possible to change the optical properties of respective layers by changing kinds and fill of fine particles in respective fine particle layers. As a result, it becomes possible to provide various optical properties to the whole fine particle layer laminated film.

It is preferable that the fine particles to be used for the fine particle layer laminated film according to the present invention comprise optically transparent fine particles, particularly, fine particles which are transparent in a visible area, since the fine particle layer laminated film according to the present invention is used as optical functional material.

According to the present invention, a fine particle characterized by an index of refraction is preferably used, since there is a strong possibility that the fine particle layer laminated film according to the present invention is used as an optical functional material by the use of, particularly, the index of refraction among the optical properties of the fine particle.

As a fine particle of an inorganic material which can be used in the concrete, such fine particles as $MgF_2$ (its index of refraction is 1.38), $SiO_2$ (its index of refraction is 1.46), $AlF_3$ (its index of refraction is 1.33–1.39), $CaF_2$ (its index of refraction is 1.44), $LiF$ (its index of refraction is 1.36–1.37), $NaF$ (its index of refraction is 1.32–1.34) and $ThF_4$ (its index of refraction is 1.45–1.5) or the like can be considered.

Alternatively, as a fine particle of an organic material, polymer fine particles can be considered. Specifically, a cross linked acrylic fine particle (for example, a MX series and a MR series manufactured by Soken Chemical & Engineering Co., Ltd.), a non cross linked acrylic fine particle (for example, a MP series manufactured by Soken Chemical & Engineering Co., Ltd), a cross linked polystyrene fine particle (for example, a SGP series manufactured by Soken Chemical & Engineering Co., Ltd.) a non cross linked polystyrene fine particle, a monodisperse polymethyl methacrylate having high cross-linkage (for example, a MS series and a M series manufactured by Soken Chemical & Engineering Co., Ltd.), these complex fine particles and a functional group introduction fine particle or the like.

According to the present embodiment, it is preferable that a silica ($SiO_2$) fine particle or a polymer fine particle is used among the above described materials of the fine particle.

Alternatively, as a particle having a high index of refraction, for example, there are a titania ($TiO_2$) fine particle and a zirconia ($ZrO_2$) fine particle.

It is preferable that an average particle diameter of such a fine particle is in the range of 1 nm to 95 nm from the point of preventing the scattering of light and particularly, it is preferable that it is in the range of 1 nm to 80 nm. It is not preferable that the average particle diameter is larger than the above described range, since a portion in which the scattering of light is generated becomes larger, so that there is a possibility that the optical property is extremely damaged. On the other hand, a case that the average particle diameter is smaller than the above described range is not realistic since a fine particle, of which particle diameter is smaller than that in the above described range, is difficult to be formed. Further, it is not preferable that the average particle diameter is smaller than the above described range, since the size of the fine particle is the same as the size of the molecule, so that throughput thereof is the same as that of a conventional alternate adsorption method.

As a measuring method of an average particle diameter according to the present invention, a measuring method is considered to measure the average particle diameter in such a manner that sum of the longest diameter and a diameter at right angle to this longest diameter is divided by two so that a biaxial average diameter is measured by means of the electron microscope observation by the use of a transparent type electron microscope and a scanning type electron microscope and then, these biaxial average diameters are summed up to be averaged.

According to the present invention, it is preferable that a density of the particles within the above described fine particle layer laminated film is in the range of 40% and 80% in percentage by volume and particularly, in the range of 45% and 80%. It is because that, in the case that a density of the fine particles is smaller than the above described range, it is not possible to effectively reflect an optical property belonged to a fine particle on a fine particle layer laminated film and a case that a density of the fine particles is larger than the above described range is not realistic at the present moment although it depends on a distribution of the particle diameters of the fine particles.

Additionally, it is preferable that a density of the particles within at least one fine particle layer in the above described fine particle layer laminated film is in the range of 40% and 80% in percentage by volume and particularly, in the range of 45% and 80%. The present invention is characterized by providing an optical function as a whole fine particle layer laminated film by changing optical properties in respective fine particle layers which are laminated in the fine particle layer laminated film. In this case, by defining a density of the particles within at least one fine particle layer in the fine particle layer laminated film within the above described range, it becomes possible that the optical property belonged to the fine particle is made into the property of the fine particle layer, and hereby, the optical function as a whole fine particle layer laminated film is capable of being effected.

According to the present invention, in the case that a density of the particles within at least one layer in the above described fine particle layers is smaller than the above described range, it becomes difficult to reflect an optical property belonged to a fine particle on a fine particle layer and further, it is difficult to laminate the fine particles since the density thereof is too small, so that it becomes difficult to maintain a fine particle layer as one layer. On the other hand, a case that a density of the fine particles is larger than the above described range is not realistic at the present moment although it depends on a distribution of the particle diameters of the fine particles. As a basis that this case is not realistic, the articles by Sanders et al. are cited herewith (Philosophical Magazine A, vol. 42, No. 6, 705–720, 1980; Philosophical magazine A, vol. 42, No. 6, 721–740, 1980). These articles are described with respect to a particle diameter ratio $\gamma = r1/r2$ ($r1 < r2$, namely, $\gamma < 1$, $r1$ and $r2$ are particle diameters, respectively) and a particle filling ratio in the case that two kinds of particles having different particular diameters are composed in a colloid crystal structure. According to their calculation, under a certain condition, if the particle diameter ratio $\gamma$ draws near to 0 boundlessly, it is assumed that the particle filling ratio draws near to 93.3% boundlessly. However, the higher limit of a more realistic particle diameter $\gamma$ is described as about 80%. On the other hand, a fine particle within a range of a particle diameter according to the present invention, which is capable of being obtained at the actual condition, is generally polydispersity and it is limited in a special case that the particles are capable of being laminated in a colloid crystal structure. In other words, they are generally laminated at random order. Considering these, the higher limit of the fine particle filling ratio of the fine particle layer laminated film according to the present invention is defined as 80%.

According to the present invention, it is possible to form a fine particle layer having a low index of refraction by regulating the above described various properties, specifically, an index of refraction of the fine particles in a fine particle layer, a density of the fine particles and an air space in the fine particle layer or the like. Specifically, it is possible to make an index of refraction of at least one fine particle layer in the fine particle layer laminated film not more than 1.32, which cannot be attained in a layer made by a single material such as a resin, particularly, in the range of 1.05 and 1.30. In the fine particle layer laminated film according to the present invention, if at least one fine particle layer is defined as a layer with a low index of refraction, it is possible to make the fine particle layer into a high quality optical functional material, for example, an antirelection film.

The fine particle layer laminated film according to the present invention may be composed in such a manner that a plurality of fine particle layers having the same fine particles are laminated or it maybe composed in such a manner that a plurality of fine particle layers having the different fine particles are laminated. For example, in the case of laminating a plurality of layers such as antirelection films or the like having different index of refraction, in order to attain a required index of refraction, the kinds of the fine particles in respective fine particle layers may be changed. Alternatively, for example, in the case that the fine particle layer laminated film according to the present invention is formed in a pattern form to be used as various optical filters or the like as described later, in order to obtain a certain thickness of a film, the fine particle layers are laminated. In such a case, the fine particle layers having the same fine particles may be laminated.

Alternatively, as a method for changing the optical properties of respective fine particle layers, as described above, in addition to a method for changing the kinds of the fine particles, for example, a method for changing a density of the fine particle and a method for changing an air space of the fine particle layer or the like are considered. By combining such methods, it is possible to extremely change the optical properties of respective fine particle layers, so that it becomes possible to obtain the optical properties, which are required as a fine particle layer laminated film.

The number of the fine particle layers in the fine particle layer laminated film according to the present invention varies according to the required film thickness and the required function or the like. However, it is normally in the range of two and two hundreds and it is preferably in the range of three and one hundred.

According to the present invention, the fine particle layer laminated film is used as an optical base material by laminating a plurality of fine particle layers as described above. However, in the case of using a plurality of fine particle layers in this way, it is preferable that a difference in an index of refraction between a fine particle layer having the lowest index of refraction among the above described plural laminated fine particle layers and a fine particle layer having the highest index of refraction among them is not less than 0.2 in an arbitrary wavelength in the range of not less than 400 nm and not more than 700 nm. It is because that, for example, in the case of effecting the fine particle layer laminated film according to the present invention as an antirelection film and various optical filters, a difference in an index of refraction to this extent is preferable for effecting its function. Alternatively, the higher limit of the difference in the index of refraction in this case varies depending on a material such as a tine particle or the like to be used and particularly, it is not limited. However, considering a general material, the higher limit of the difference in the index of refraction is not more than 1.7.

It is assumed that a value, which is measured by using spectroscopic ellipsometry, is used as a value of an index of refraction according to the present invention, since it is possible to measure wavelength dispersion of the index of refraction and an extinction coefficient according to the spectroscopic ellipsometry enables so that an optical property of a film is capable of being sufficiently grasped.

Although a composition and a constitution of respective fine particle layers according to the present invention are different depending on a manufacturing method thereof to be described later, normally, they are formed by the fine particle and polymer molecules to support the fine particles and they have certain air spaces.

As an application of the fine particle layer laminated film according to the present invention, it is possible to cite an application making good use of its optical function. Specifically, it is possible to consider an antirelection film, various optical filters and a color filter for display or the like.

2. An Optical Functional Material

Some of the fine particle layer laminated films according to the present invention have self supporting properties depending on its manufacturing method. In the case that the fine particle layer laminated film has self supporting property in this way, it is also possible to use the fine particle layer laminated film by itself as various elements by the use of its optical function. However, the fine particle layer laminated film is normally used as an optical functional material together with a supporting material.

According to the present invention, as such a supporting material, it is possible to cite a transparent base material and a transparent sealing material. In this case, the transparent base material is arranged on one of the surfaces of the above described fine particle layer laminated film to support the fine particle layer laminated film. In the manufacturing method thereof to be described later, the fine particle layer laminated film is normally formed by laminating the fine particle layers on the base material and it is possible to make the fine particle layer laminated film into an optical functional material having a transparent base material if the base material comprises a transparent base material in this case. Alternatively, a method for forming the fine particle layer laminated film on the transparent base material is not limited to this. For example, the fine particle layers are laminated on the base material, on which the fine particle layers are capable of being easily laminated, and then, the transparent base material is accreted on an upper surface of the formed fine particle layer laminated film to be transcribed, so that the fine particle layer laminated film is made into an optical functional material comprised of a transparent base material and the fine particle layer laminated film, which is formed on a surface of this transparent base material.

As such a transparent base material, it is possible to apply a resin and a glass or the like, As a shape, a transparent base material can takes any shape such as a film, a sheet, a plate, a shape having a curved surface, a tubular structure and a complex shape or the like.

As a transparent base material made of resin, triacetyl cellulose, diacetyl cellulose, acetate-butylate cellulose, polyether sulfone, polyacrylate based resin, polyurethane based resin, polyester, polycarbonate, polysulfone, polyether, trimethylpentene, polyether ketone, (meta) acrylonitrile and the like can be listed.

As a transparent base material to be used for the present invention, PET and glass or the like is generally used as a material thereof.

On the other hand, as other supporting material to support the fine particle layer laminated film, a transparent sealing material can be considered. This transparent sealing material comprises a supporting material, which is arranged excepting for at least one surface of the fine particle layer laminated film. Specifically, as described above, a fine particle layer laminated film is formed on a base material and a transparent sealing material is accreted on the upper surface of the fine particle layer laminated film so that it seals this fine particle layer laminated film. By removing the base material, it is possible to make the fine particle layer laminated film into an optical functional material, of which all surfaces except for one surface, on which a base material is arranged, are supported by the transparent sealing materials. Further, in the case that the base material comprises a transparent material, this transparent sealing material and the transparent base material may be commonly used as a supporting material.

As a material which can be used as a transparent sealing material according to the present invention, a resin, which is transparent in a visible light area, is preferably used. Specifically, an acrylic resin, an epoxy resin, fluorocarbon resin, polycarbonate resin, a polysilane class and a silicon resin or the like can be cited.

Thus, a transparent sealing material is preferably used, for example, in the case that an adsorption force between the fine particle layers of the tine particle layer laminated film is weak so that reinforcement from a side surface is needed, in the case that it is necessary to prevent free water and oxygen intrude depending on the kinds of the fine particle and further, in the case that it is inconvenient that the fine particle layer laminated film is deformed by free water or the like.

According to an optical functional material of the present invention, the fine particle layer laminated film may be formed on the above described supporting material or in the supporting material in a pattern form. It is because that, by forming the fine particle layer laminated film in a pattern form, it is possible to use the fine particle layer laminated film as various optical functional materials such as various optical filters or the like.

As a method for forming a fine particle layer laminated film on a supporting material, it is possible to cite a method to use a transparent base material as a supporting material, form a hydrophilic/hydrophobic pattern or an acid/base pattern and form a fine particle layer laminated film on this transparent base material. Alternatively, as a method for forming a fine particle layer laminated film within a supporting material in a pattern form, it is possible to cite a method to form a fine particle layer laminated film within a supporting material in a pattern form on a base material according to the above described method, apply a transparent sealing material so as to seal this fine particle layer laminated film formed in a pattern form to harden this fine particle layer laminated film and then, remove the base material if necessary.

3. A Manufacturing Method of a Fine Particle Layer Laminated Film

According to the present invention, the above described manufacturing method of fine particle layer laminated film is normally manufactured according to two manufacturing methods to be described below. Each method will be explained below.

A. A First Manufacturing Method

A first manufacturing method of a fine particle layer laminated film according to the present invention is characterized in that the fine particle layers containing the fine particles, of which average particle diameters are in the range of 1 nm and 95 nm, are layered on a base material according to an alternate adsorption method to form a fine particle layer laminated film.

It is possible to use the same fine particle as that as described above here, so that the explanation thereof is herein omitted. Alternatively, a base material is not particularly limited, if it is possible to laminate the fine particle layer thereon. However, by using the above described transparent base material, it is also possible to form a fine particle layer laminated film as well as to form an optical functional material.

According to the first manufacturing method, as an interaction of an alternate adsorption method, it is possible to use an electrostatic interaction and other actions by the use of hydrogen bonding and an electric charge transfer interaction or the like. However, according to the present invention, it is preferable that a fine particle layer laminated film is manufactured according to an alternate adsorption method by the use of the electrostatic interaction. It is because that, by manufacturing a fine particle layer laminated film according to an alternate adsorption method by the use of the electrostatic interaction, it is possible to form a fine particle layer laminated film having a strong adsorption strength relatively easily and further, it is possible to use a commercially available polyelectrolyte, so that this method is advantageous in cost. Alternatively, it is because that, according to an alternate adsorption method by the use of the electrostatic interaction, the fine particles are evenly arranged on a base material when the fine particles are accreted on the base material, in other words, when a fine particle layer is formed on the base material, so that it is possible to form a fine particle layers, which has a high optical function in the case that it forms a fine particle layer laminated film.

Although a method is not particularly limited in the case that the fine particles are accreted on the base material by the electrostatic interaction according to the alternate adsorption method in this way, normally, a method is applied to provide any one of positive and negative electric charges on the base material and accrete the fine particles on the base material by the electrostatic interaction by using a fine particle having a polarity opposite to that of this electric charge.

As a method to provide an electric charge on a surface of the base material, there are a case of merely charging a surface of the base material physically and a case that an ionic functional group is provided on a surface of the base material physically or chemically. According to the present invention, since the former case lacks the stability in the electric charge, the later method to provide the ionic functional group on a surface of the base material is preferable.

As a method to introduce the ionic functional group into this surface of the base material, a corona discharge process, a glow discharge process, plasma process, a hydrolysis process, a silane coupling process, application of a polyelectrolyte and formation of a polyelectrolyte multilayer film or the like can be cited. However, according to the present invention, it is preferable to form a polyelectrolyte film, which is obtained by applying the polyelectrolyte. This depends on the following reason.

At first, it is generally possible to form a fine particle layer having a high optical function, in which the fine particles are evenly accreted on a base material, if a density of the electric charges on the surface of the base material is higher. On the other hand, by forming a polyelectrolyte film on the base material, it is possible to heighten the density of the electric charges compared to other method. Accordingly, by forming a polyelectrolyte film on the base material and accreting the fine particles on the base material, namely, on the polyelectrolyte film by an electrostatic interaction between this polyelectrolyte film and the fine particles, it is possible to obtain the fine particle layer in which the fine particles are evenly accreted. As a result, it is possible to obtain a fine particle layer laminated film having a high optical function.

Further, it is often the case that the ionic functional group to be introduced is generally an anion group In a corona discharge process, a glow discharge process, a plasma process and a hydrolysis process. Therefore, an electric charge on a surface of a fine particle is limited to cation. On the other hand, since the polyelectrolyte can freely select anion, cation, these densities and these balances arbitrarily, so that the electric charge on the surface of the fine particle is not limited to any one of anion and cation. From this point, it is preferable to form a polyelectrolyte film composed of the polyelectrolyte as a method to provide the electric charge on the surface of the base material.

Further, since it is often the case that the surface of the base material has ahydrophobic property, it is also effective to use the above described method at the same time as a method to provide the electric charges sufficiently on the surface of the base material. For example, after providing at least one of a corona discharge process, a glow discharge process, a plasma process, a hydrolysis process and a silane coupling process on the surface of the base material, it is also possible to applying the polyelectrolyte or forming the polyelectrolyte multilayer film and this can be considered as a preferable method.

In the case of providing the electric charges on the surface of the base material by forming the polyelectrolyte film, it is preferable that a thickness of the polyelectrolyte film is thinner than the average particle diameter of the fine particle and further, it is preferable that a thickness of the polyelectrolyte film is less than 50% of the average particle diameter of the fine particle. It is not preferable that a thickness of the polyelectrolyte film is not less than the average particle diameter of the fine particle. It is because that, if a thickness of the polyelectrolyte film is not less than the average particle diameter of the fine particle, there is a possibility that the polyelectrolyte film is defective with respect to an optical function of the fine particle film in such a manner that the fine particles are partially laminated not less than two layers so as to disperse the visible light to enter, decrease the interval between the fine particles or seals the air spaces.

According to the present invention, it is preferable that such a polyelectrolyte film comprises a multilayer film, which is formed in such a manner that the polyelectrolyte films more than two kinds having different polarities each other are laminated. As a method to form such a polyelectrolyte multilayer film, it is possible to preferably use a publicly known method, namely, so-called alternate adsorption film manufacturing method (Layer-by-Layer Assembly method). According to this method, by alternately soaking a base material in a cation polyelectrolyte solution and in an anion polyelectrolyte solution, a polyelectrolyte multilayer film is formed on the base material by means of controlling a thickness of a film in nano order (for example, Gero Decher et al., Science, Vol. 277, p. 1232, 1997; Seimei Shiratori et al., Shingakugihou OME98–106, 1988; Jpseph B. Schlenoff et al., Macromolecules, Vol. 32, p. 8153, 1999) According to this method, even if the thickness of the polyelectrolyte multilayer film is not less than the particle diameter of a fine particle, a fine particle layer is formed by a single particle layer. It is because that, the polyalectrolyte multilayer film comprises a polyelectrolyte complex, which does not solve in a media (mainly, water), so that it is hardly dispersed in the media and the fine particles mutually act merely with a surface of the polyelectrolyte multilayer film.

Additionally, according to the present invention, it is preferable that the polyelectrolyte to form the above described polyelectrolyte film is a cross-linked polyelectrolyte. It is because that, by using the cross-linked polyelectrolyte, it is possible to prevent multilayering of the particles, which are not necessary and inconvenient in the fine particle layer. This cross-linked polyelectrolyte is preferably used in the case of forming the polyelectrolyte with a single layer and in the case of making the polyelectrolyte into the above described polyelectrolyte multilayer film. In the case of the polyelectrolyte multilayer film, the polyelectrolyte, of which highest layer is only cross-linked, may be used or the polyelectrolyte multilayer film may be formed by the polyelectrolyte, of which all layers are cross-linked.

According to the present invention, upon forming a plurality of fine particle layers by the electrostatic interaction by the use of such a polyelectrolyte film, after a polyelectrolyte film is formed and the fine particles are accreted on this polyelectrolyte film, a process is repeated in such a manner that a polyelectrolyte film is further formed thereon and the fine particles are accreted thereon again.

As a polyelectrolyte used in the present invention, polyethylene imine and its quaternary compound, polydiallyldimethyl ammonium chloride, poly (N,N'-dimethyl-3,5-dimethylene-piperidinium chloride), polyallylamine and its quaternary compound, polydimethylaminoethyl(meta)acrylate and its quaternary compound, polydimethylaminopropyl(meta)acrylamide and its quaternary compound, polydimethyl(meta)acrylamide and its quaternary compound, poly(meta)acrylate and its ionized compound, polystyrene-sulfonic acid sodium salt, poly (2-acrylamide-2-methyl-1-propanesulfonic acid), polyamino acid, polyvinyl-sulfonic acid potassium salt, and further, copolymers of monomers constituting the above-described polymer and an nonionic aqueous solution monomer such as (meta)acrylamide, 2-hydroxyethyl (meta) acrylate, N-isopropyl(meta)acrylamide and the like can be listed.

In the present invention, among these, it is preferable to use polyethylene imine quaternary compound, polydiallyldimethyl ammonium chloride, poly (N,N'-dimethyl-3,5-dimethylene-piperidinium chloride), polyallylamine quaternary compound, polydimethylaminoethyl (meta)acrylate quaternary compound, polydimethylaminopropyl (meta) acrylamide quaternary compound, poly-methyl (meta) acrylamide quaternary compound, poly (meta)sodium acrylate, polystyrelene sodium sulfonate, poly (2-acrylanide-2-methyl-1-propane sulfonate), polyvinyl potassium sulfonate, and further copolymers of a monomer constituting the above-described polymer and a nonionic aqueous a solution monomer such as (meta)acrylamide, 2-hydroxyethyl (meta)acrlylate, N-isopropyl(meta) acrylamide and the like.

Alternatively, as a cross-linked polyelectrolyte, it is possible to cite a cross-linked substance of a monomer composing the above described polyelectrolyte and a polyfunctional monomer such as metylene bisacryamide, a cross-linked substance due to reaction between the above described polyelectrolyte and aldehyde genera, an electron beam to the above described polyelectrolyte and a cross-linked substance due to the gamma ray irradiation or the like.

According to the first manufacturing method, by using a transparent base material as a base material as described above, alternatively, by transcribing the fine particle layer laminated film which is formed on the transparent base material, it is possible to obtain an optical functional material, in which the fine particle layer laminated film is formed on the above described supporting material. Alternatively, by applying the above described transparent sealing material so as to seal the fine particle layer laminated film on the base material, it is possible to manufacture an optical functional material, in which the fine particle layer laminated film is formed in the supporting material Further, by forming the above described polyelectrolyte on the transparent base material in a pattern form, it is possible to obtain an optical functional material, in which the fine particle layer laminated film is formed in a pattern form.

B. A Second Manufacturing Method

A second manufacturing method according to the present invention is characterized by forming a fine particle layer laminated film on a base material by means of repeating a fine particle layer forming process for forming the fine particle layer plural times by forming a layer containing polymer molecules having a polyelectrolyze on a base material; preparing a fine particle dispersed liquid, in which the fine particles, of which average particle diameters are in the range of 1 nm and 95 nm, are dispersed in a solvent capable of swelling the layer containing polymer molecules so as to contact the layer containing polymer molecules with the fine particle dispersed liquid.

The second manufacturing method according to the present invention will be described in detail below. This second manufacturing method is characterized by including at least two processes, namely, (1) a process for forming a layer containing polymer molecules having a polyelectrolyte on a base material and (2) a process for preparing a fine particle dispersed liquid, in which the fine particles, of which average particle diameters are in the range of 1 nm and 95 nm, are dispersed in a solvent capable of swelling the layer containing polymer molecules so as to contact the layer containing polymer molecules with the fine particle dispersed liquid. According to such a method, the fine particles are evenly filled within the above described layer containing the polymer molecules and hereby, it becomes possible to form a fine particle layer laminated film. Then, by repeating this process, it is possible to form a fire particle layer laminated film, in which the fine particle layers are laminated.

The above described second manufacturing method according to the present invention will be described in detail below.

At first, a first process, namely, a process to form a layer containing the polymer molecules will be described.

According to the present invention, a method for forming this layer containing the polymer molecules is not particularly limited. For example, the layer containing the polymer molecules maybe independently formed in a sheet, for example, by injection molding or the like, or it may be formed on a base material. However, it is preferable that the layer containing the polymer molecules may be formed on the base material, since it is often the case that to use a thin film layer containing the polymer molecules is effective. As a method for forming this layer containing the polymer molecules on the base material, it is possible to adopt various coating methods such as spin coating, screen coating, roll coating, dip coating and die coating or the like Alternatively, with respect to hardening on the base material, there are various methods depending a material to be used. If the high polymer is solved in a solvent, a method to remove the solvent can be cited. In the case of forming the layer containing the polymer molecules by reacting it on the base material, a method to harden by heat and a method to irradiate energy such as a light or the like can be cited.

The layer containing the polymer molecules may be formed on the above described base material in a pattern form. As a method to form it in a pattern form, for example, a method to directly draw a desired pattern on a surface of the base material by the use of polyelectrolyte ink, specifically, a nozzle exhaling method maybe used. As such a nozzle exhaling method, for example, it is possible to use a method to blow off the polyelectrolyte ink from a micro syringe, a dispenser, an ink jet and needlepoint by an external impulse such as an electric field or the like, a method to blow off the polyelectrolyte ink from an element by the use of an oscillation element such as a piezo element oscillating by the external impulse and a method to accrete the polyelectrolyte ink, which is accreted on the needlepoint, on the surface of the base material or the like. Alternatively, it is also possible to use a general method to form a pattern of the polymermaterial, for example, such a method that a pattern of a lyophilic region having good wettability is formed in a lyophobic region having bad wettability and the polyelectrolyte solution in liquid form is applied thereon, so that the polyelectrolyte is accreted only on a lyophilic region.

A base material to be used for the present invention is not particularly limited. However, by using the above described transparent base material, it is possible to make the transparent base material into an optical functional material as it is.

According to this second manufacturing method, it is preferable that the polyelectrolyte has an electric charge opposite to the electric charge of the fine particles. This depends on the following reason.

In other words, in a fine particle dispersed liquid in which the fine particles are evenly dispersed, it is generally that the surfaces of the tine particles are normally charged with electricity. Particularly, this tendency is strong in a polar solvent such as water or the like. In the vicinity of this charged region, a counter ion exists and around the particles, an electric double layer is formed. Therefore, an electrostatic repulsive force acts between the fine particles, so that the fine particles are stably dispersed in the medium. Additionally, a solvate layer can also prevent the contact between the fine particles. Therefore, it is preferable that the polyelectrolyte on the base material has a function to generated an electrostatic attracting force with the fine particles and a function to desolvate the fine particles. It is a polyelectrolyte having an electric charge opposite to the above described electric charge of the fine particles that fulfills the condition. If the polyelectrolyte has an electric charge opposite to the above described electric charge of the fine particles, the attracting force is generated between the fine particles, so that the unstabilized fine particle quickly forms a compound material with the polyelectrolyte existing in the periphery thereof in the high density. Accordingly, compared to a normal polyelectrolyte, it is possible to take in, fill and fix the fine particles more effectively.

Alternatively, according to the present invention, it is preferable that the layer containing the polymer molecules including the above described polyelectrolyte is water soluble. It is because that, it is often the case that the fine particles to be preferably used are dispersed in the water system medium and considering the case of using the layer containing the polymer molecules in practice, such a water soluble layer, which can be used in a water system fine particle dispersed, is preferable. Further, if case that the layer containing the polymer molecules comprises the polyelectrolyte and the fine particles are dispersed in a water system medium, in any case that a high salt concentration area is formed on a surface of the polyelectrolyte to unstabilize the condition of the fine particle in the fine particle dispersed liquid as described above and that the fine particles are taken into the polyelectrolyte by the use of the electrostatic attraction force to fix them, if the above described processes are performed in the water system medium, it is possible to increase the degree of ionization and perform the processes effectively.

As these water-soluble polyelectrolytes which are the most suitable ones for the second method of manufacturing, imines such as polyethylene imine and the like, amines such as polyallylamine, polyvinylpyridine and the like, sulfonic acids such as polystyrenesulfonic acid and the like, carboxylic acids such as polyacrylic acid and the like, natural polymers such as gelatin, arginic acid and the like and salts of their ionic polymers, and amides such as polyacrylamide and the like are listed. These polymers can be denatured corresponding to their uses, and copolymers consisted of monomers of these polymers as their one component can be also preferably used.

In the next place, a process for contacting the above described layer containing the polymer molecules with the fine particle dispersed liquid will be explained.

As a method to contact the layer containing the polymer molecules with the fine particle dispersed liquid, specifically, it is possible to cite a method to soak the layer containing the polymer molecules in the fine particle dispersed liquid and a method to apply the fine particle dispersed liquid on a surface of the layer containing the polymer molecules.

The fine particle dispersed liquid to be used for the present invention is composed of a fine particle and a medium and in this fine particle dispersed liquid, it is necessary that this medium (solvent) swells the above described layer containing the polyelectrolyte.

As a fine particle dispersed in the fine particle dispersed liquid, it is possible to use the same fine particle as that described above, so that the explanation thereof is herein omitted.

The second manufacturing method of the present invention is significantly characterized in that it is possible to evenly disperse the fine particles, of which particle diameters are small, in the high density without agglomeration and fix them. This is not possible according to the conventional method such that the fine particles and the polyelectrolyte are mixed in the solvent to disperse the fine particles and then, the solvent is removed to obtain the fine particle layer.

If a density of the above described fine particles in the fine particle dispersed liquid to be used for the present invention is regulated, it is possible to control the density of the fine particles in the fine particle layer to be finally obtained. According to the present invention, a plurality of attracting forces between the fine particle and the high polymer is positively used, so that it is conceived that a density of the fine particles in the fine particle layer to be finally obtained is higher than a density of the fine particles in the fine particle dispersed liquid. According to the present invention, by regulating the density of the fine particle dispersed liquid, it is also possible to obtain the fine particle layer, in which the fine particles are filled in the closet packing in practice.

As described above, the density of the fine particles in the fine particle dispersed liquid being fit to use becomes larger depending on the density of the fine particle necessary for the fine particle layer. However, generally, the density of the fine particles in the fine particle dispersed liquid is in the range of 1 percent by volume and 65 percent by volume. Preferably, it is in the range of 1 per cent by volume and 55 per cent by volume and particularly, it is in the range of 3 per cent by volume and 50 per cent by volume.

As described above, the medium (solvent) to be used in such a fine particle dispersed liquid is needed to swell the above described polyelectrolyte. It is preferable that a degree of this swelling is in the range of a degree that the above described polyelectrolyte can be completely solved in the medium (solvent) (in the case that polyelectrolyte is not cross-linked) and a degree that the polyelectrolyte is swelled so that it is doubled from its initial volume (in the case that the polyelectrolyte is cross-linked and not cross-linked).

The above described medium (solvent) is not particularly limited if it can swell the layer containing the polymer molecules as described above. As the medium (solvent), it is possible to cite alcohol class such as ethyl alcohol and isopropyl alcohol or the like, amide class such as dimethyl formamide or the like, sulfoxide class such as dimethyl sulfoxide or the like, glycol class such as ethylene glycol or the like and water or the like.

As described above, a water soluble polyelectrolyte is preferable as the high polymer composing a layer containing the polymermolecules, so that as a medium in the second manufacturing method, such a medium (solvent) to solve a water soluble polymer molecule is preferable. As such a medium, the medium, of which dielectric constant is not less than 2, is preferable. Specifically, at is possible to cite water (81 (i.e., dielectric constant at 20 degrees Celsius, if it is not particularly described, the followings are the same as this), methanol (33.2), acetone (21.4), morpholine (7.42 (however, at 25 degrees Celsius) and 1,4-dioxane (2.32) or the like, According to the second manufacturing method, as described above, a polyelectrolyte is preferable for composing a layer containing the polymer molecules and particularly, a water soluble polyelectrolyte is preferable Accordingly, it is preferable that a medium of the above described fine particle dispersed liquid also solves this water soluble polyelectrolyte. However, since this water soluble polyelectrolyte is best solved in water, so that it is possible to cite water as the best medium.

Such a medium may be used by itself or more than two kinds of the mediums may be mixed. Further, in order not to prevent the dispersion of the fine particles, it is preferable that the ionicity impurities are as less as possible.

It is possible to add a surface active agent in such a fine particle dispersed liquid according to need.

The kinds of the fine particle dispersed liquid to be used in the second manufacturing method is not particularly limited if the fine particles are evenly dispersed in the fine particle dispersed liquid. However, the fine particle dispersed liquid which is a solid particle dispersion system (dispersed colloid), a molecule association dispersion system (micell colloid) and a polymer molecule dispersion system (molecular colloid).

According to the second manufacturing method, in addition to the above described two processes, if there is a process which is required depending on a requirement property of other obtained fine particle layer, it is possible to perform the process according to the need. By repeating at least two processes which are described above, it is possible to laminate the fine particle layers; so that it is possible to obtain a fine particle layer laminated film.

A fine particle layer laminated film, which is obtained according to the second manufacturing method, is significantly characterized in that the fine particles are evenly dispersed and filled in the polyelectrolyte. In this case, a fact that the fine particles are evenly dispersed in the polyelectrolyte not only means that the fine particles do not form aggregate but also means that the intervals between the fine particles are not ununiformity such that the high polymers and the fine particles are layered. In other words, the fine particle layer laminated film, which is obtained according to the second manufacturing method, has a first characteristic in the fine particle layer obtained according to the second manufacturing method, the fine particles are not aggregated but they are dispersed so that the interval between the fine particles are regulated.

Alternatively, the fine particle layer laminated film, which is obtained according to the second manufacturing method, is secondly characterized in that it has self supporting property. In other words, it is possible to maintain a figure of the obtained fine particle layer laminated film even without a base material and if necessary, it is also possible to use this fine particle layer laminated film with not being supported on the base material. It is also possible to obtain such a fine particle layer laminated film, which is not supported by the base material, in such a manner that, as described above, a fine particle layer laminated film is formed on the base material and then, the fine particle layer laminated film is removed from the base material. Alternatively, it is also possible to manufacture such a fine particle layer laminated film, which is not supported by the base material, in such a manner that a layer containing polymer molecules is formed by itself to contact this layer containing polymer molecules with the fine particle dispersed liquid.

The present invention is not limited to the above described embodiments. The above described embodiments are merely examples and various modifications will be contained in a technical scope of the present invention if they have substantially same constitutions as a technical spirit described in claims of the present invention and they realize the same effect as a technical spirit described in claims of the present invention.

EXAMPLES

The fine particle layer laminated film according to the present invention will be explained more specifically with reference to the examples below.

Example 1

Material

As a cation basis polyelectrolyte, polydiallyldimethyl anmonium chloride (hereinafter, refereed to as PDDA. Its average particle amount is ten hundred thousand to twenty hundred thousand and it is made by Aldrich Company) was used. As an anion basis polyelectrolyte, polystyrene-sulfonic acid sodium salt (hereinafter, refereed to as PSS. Its average particle amount is seven hundred thousand and it is made by Aldrich Company) was used. As a fine particle, two kinds of fine particles were used, as a fine particle having a low index of refraction, a silica fine particle (made by Nissan Chemical Industries, Ltd., snow tex ZL (a brand name, hereinafter, referred to as ZL) was used and as a fine particle having a high index of refraction, a titania fine particle (made by ISHIHARA SANGYO KAISYA Ltd., STS-02 (a brand name, hereinafter, referred to as TS) was used. According to an electron microscope observation, an average particle diameter of ZL was 72 nm and an average particle diameter of STS was 50 nm (a secondary particle diameter) and 7 nm (a primary particle diameter).

Formation of a Film

1. To Provide an Electric Charge to a Base Material

By using a PDDA water solution of 0.4 percent by weight and a PSS water solution of 0.4 percent by weight, PDDA and PSS were repeatedly adsorbed on the both surfaces of a washed glass base material eight times. Finally, by making PDDA adsorbed on the both surfaces of a washed glass base material, an alternate adsorption film was manufactured and an electric charge was provided to a surface of the base material. Time for adsorption was two minutes for respective polymers and time for cleaning between the adsorption was 1.5 minutes, respectively.

2. Formation of a Fine Particle Layer Laminated Film

As described above, by using a base plate which is provided with an electrIc charge, fine particle layer laminated films were formed on the both surfaces of the base material. An order of laminating of the fine particle layer was (ZL/PDDA/ZL/PDDA/PSS/STS/PSS/STS/PSS/PDDA). The fine particle layer laminated films were laminated ten times in the above order and then, they were laminated in an order of ZL/PDDA/ZL.

Time for adsorption of the fine particles was one minute, respectively and time for adsorption of the polymer molecules was two minutes, respectively. Time for cleaning between the adsorption was 1.5 minutes, respectively.

Evaluation

A result of measuring the transmittance of the obtained fine particle layer laminated film was shown in FIG, 1. The measurement was carried out by the use of a spectroscope UV-3100PC made by Shimadzu Corp. As shown in FIG. 1, a peak was found on the basis of a dielectric multilayer configuration of the film in the vicinity of 610 nm.

Alternatively, a cross section of the fine particle layer laminated film was observed by the electron microscope. As an electron microscope, a scan type electron microscope H-5000 made by Hitachi, Ltd. was used. As shown in FIG.

2, a silica fine particle layer (a large particle) and a titania fine particle layer (a small particle) were laminated and further, a fine particle layer laminated film was perceived.

Further, simulating an index of refraction of a film configured by ZL/PDDA/ZL which are constitutional elements of the film according to the present invention by the use of its measured reflection coefficient spectrum, it was found that the index of refraction of the film configured as described above was 1.29 (at 550 nm).

Example 2

After dip-coating a cation basis polyelectrolyte C-200H (a particle amount is two million and five hundred thousand, made by Dauichi Kogyo Seiyaku Company) ultra thin film on a glass base plate, a particle film in which two silica particle layers are formed was formed by soaking this ultra thin film in ZL and cleaning it. After that, a ultra thin film of PSS (an average particle amount is one million, made by Aldrich Company) was manufactured on a base plate provided with this particle film by dip coating and then, a particle film in which two titania particle layers are formed was formed by soaking this ultra thin film in STS and cleaning it. Repeating this procedure, an ultra fine particle multilayer film having the same optical property as that of the example 1 was manufactured.

Example 3

Material

Figure 3:
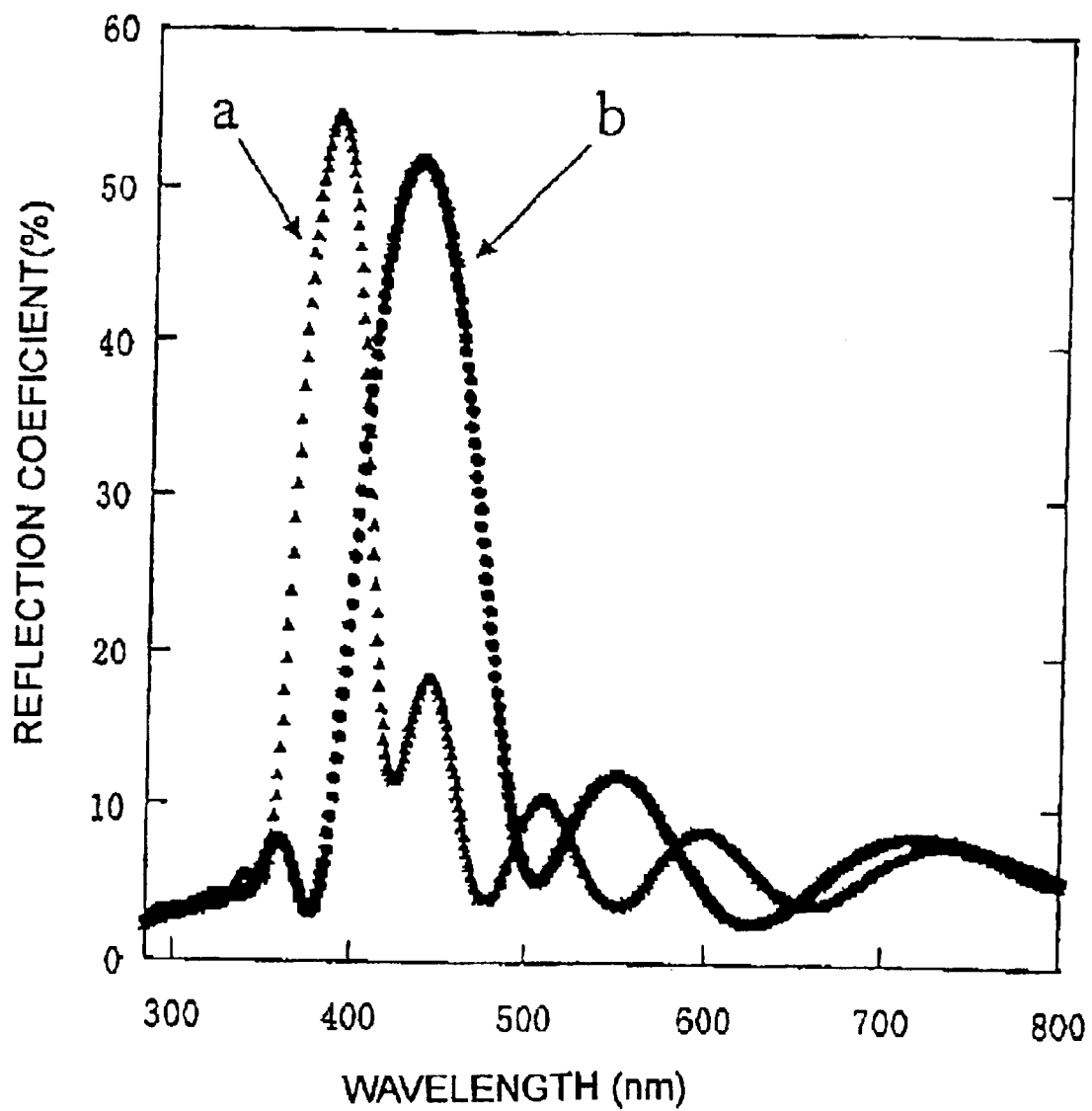
FIG. 3 is a graph for illustrating a reflection coefficient of a third embodiment and a fourth embodiment according to the present invention.

As a cation basis polyelectrolyte and an anion basis polyelectrolyte, PDDA and PAA according to the example 1 were used. As a silica fine particle, snow tex ZL made by Nissan Chemical Industries, Ltd. (a brand name, hereinafter, referred to as sn40) was used and as a titania fine particle, (made by ISHIHARA SANGYO KAISYA Ltd., STS-01 (a brand name, hereinafter, referred to as sts01) was used.
Formation of a Film
1. To Provide an Electric Charge to a Base Material By using a polyelectrolyte water solution as same as the water solution according to the example 1, PDDA and PSS were repeatedly adsorbed on the both surfaces of a washed glass base material ten times, so that an alternate adsorption film was manufactured. Then, an electric charge was provided to a surface of the base material. Time for adsorption was two minutes for respective polymers and time for cleaning between the adsorption was 2.5 minutes, respectively. It was qualitatively confirmed that the electric charge was provided on the surface of the base material by measuring a zeta electrometer made by Otsuka Denshisha (LEZA-600) and a flat plate material cell.
2. Formation of a Fine Particle Layer Laminated Film As described above, by using a base plate which is provided with an electric charge, fine particle layer laminated films were formed on the both surfaces of the base plate. At first, sts01 and PSS were repeatedly adsorbed four times, respectively, so that a layer having a high index of refraction, in which four titania fine particle layers were laminated and the uppermost surface was PSS rich, was formed. Then, on this layer, PDDA and sn40 were repeatedly adsorbed seven times, respectively, so that a film, in which seven silica fine particle layers were laminated, was formed. Finally, by making PDDA adsorbed one time, a film having a low index of refraction was formed. Subsequently, on this layer, PSS and sts01 were repeatedly adsorbed four times, respectively, so that a titania layer was formed. Finally, by making PSS adsorbed one time, a film having a high index of refraction was formed. In this way, 7.5 period film (sum of the layers having a high index of refraction was eight layers, sum of the layers having a low index of refraction was seven layers and they were laminated alternately) was formed. Time for adsorption of a fine particle and time for adsorption of a polymer molecule were two minutes, respectively, time for cleaning after adsorbing the fine particle was five minutes and time for cleaning after adsorbing the polymer molecule was three minutes.
Evaluation A result of measuring the reflection coefficient of the obtained glass plate provide with a fine particle layer laminated film was shown in FIG. 3a. As shown in FIG. 3a, a reflection peak was found on the basis of a dielectric multilayer configuration of the film in the vicinity of 385 nm.

Example 4

Material

The same material as that according to the example 3 was used.
(Formation of a Film)
1. To Provide an Electric Charge to a Base Material According to the same method as that according to the example 3, an electric charge was provided to the base material.
2. Formation of a Fine Particle Layer Laminated Film Other than that ten silica fine particle layer by the use of sn40 were laminated, according to the same method as that according to the example 3, the material was manufactured. Then, a 5.5 period film (sum of the layers having a high index of refraction was six layers and sum of the layers having a low index of refraction was five layers) was manufactured.
(Evaluation)

A result of measuring the reflection coefficient of the obtained glass plate provide with a fine particle layer laminated film was shown in FIG. 3b. As shown in FIG. 3b, a reflection peak was found on the basis of a dielectric multilayer configuration of the film in the vicinity of 435 nm.

Example 5

According to a method for sucking a drug solution and a cleaning fluid by a tube and discharging them by a tube in the same film formation sequence as that according to the example 4, an optical interference filter was evenly manufactured across an inner wall of the tube across about 10 cm with a transparent plastic tube having a length of 15 cm and an inner diameter of 5 nm as a base material.

What is claimed is:

1. A fine particle layer laminated film in which a plurality of fine particle layers containing the fine particles, of which average particle diameters are in the range of 1 nm and 95 nm, are laminated; wherein
   the fine particles in the fine particle layer laminated film are accreted by polymer molecules;
   there are air spaces within a film of the fine particle laminated film; and
   a density of the fine particles in the fine particle layer laminated film is in the range of 40% and 80% in percentage by volume.
2. A fine particle layer laminated film according to claim 1,
   wherein the fine particle layer laminated film comprises fine particle layers having at least not less than two kinds of different indices of refraction.

3. A fine particle layer laminated film according to claim 1, wherein a difference in an index of refraction between a fine particle layer having the lowest index of refraction among the above described plural laminated fine particle layers and a fine particle layer having the highest index of refraction among them is not less than 0.2 in an arbitrary wavelength in the range of not less than 400 nm and not more than 700 nm.

4. A fine particle layer laminated film according to claim 1, wherein an index of refraction of at least one fine particle layer in the fine particle layer laminated film is not more than 1.32.

5. An optical functional material comprising a fine particle layer laminated film according to claim 1 and a supporting material for supporting this fine particle layer laminated film.

6. An optical functional material according to claim 5, wherein the supporting material comprises a transparent base material, which is arranged on one surface of the fine particle layer laminated film.

7. An optical functional material according to claim 5, wherein the supporting material comprises a transparent sealing material, which seals the fine particle layer laminated film with leaving aside one surface of the fine particle layer laminated film.

8. An optical functional material according to claim 5, wherein the fine particle layer laminated film is formed on the supporting material or in the supporting material in a pattern form.

9. A manufacturing method of a fine particle layer laminated film comprising a process of forming a fine particle layer laminated film on a base material by laminating the fine particle layers containing the fine particles, of which average particle diameters are in the range of 1 nm and 95 nm, according to an alternate adsorption method and wherein an index of refraction of at least one fine particle layer in the fine particle layer laminated film is not more than 1.32.

10. A manufacturing method of a fine particle layer laminated film according to claim 9, wherein the alternate adsorption method depends on the electrostatic interaction.

11. A manufacturing method of a fine particle layer laminated film comprising a process of forming a layer containing polymer molecules having a polyelectrolyte on a base material;

preparing a fine particle dispersed liquid, in which the fine particles, of which average particle diameters are in the range of 1 nm and 95 nm, are dispersed in a solvent capable of swelling the layer containing polymer molecules;

forming a fine particle layer laminated film on a base material by means of repeating a fine particle layer forming process, which is a process to contact the layer containing polymer molecules with the fine particle dispersed liquid, for forming the fine particle layer plural times.

12. A manufacturing method of a fine particle layer laminated film according to claim 11, wherein the polyelectrolyte is a polyelectrolyte having an electric charge opposite to the electric charge of the fine particles and the polyelectrolyte is a water soluble polyelectrolyte.

* * * * *